United States Patent [19]

Takahashi et al.

[11] 4,054,038
[45] Oct. 18, 1977

[54] SLIDING CONSTANT VELOCITY UNIVERSAL JOINT

[75] Inventors: Koichi Takahashi, Yokohama; Nobuteru Hitomi, Yokosuka; Taisuke Kizu, Fujisawa, all of Japan

[73] Assignee: Nissan Motor Company, Limited, Yokohama, Japan

[21] Appl. No.: 672,936

[22] Filed: Apr. 2, 1976

[30] Foreign Application Priority Data

Apr. 15, 1975 Japan .................................. 50-44795

[51] Int. Cl.² .............................................. F16D 3/30
[52] U.S. Cl. ............................................... 64/21; 64/8
[58] Field of Search ..................................... 64/21, 8, 7

[56] References Cited

U.S. PATENT DOCUMENTS

| | | | |
|---|---|---|---|
| 3,296,834 | 1/1967 | Gravel | 64/21 |
| 3,557,572 | 1/1971 | Aucktor et al. | 64/8 |
| 3,785,172 | 1/1974 | Parsons | 64/21 |

Primary Examiner—Samuel Scott
Assistant Examiner—Randall Heald
Attorney, Agent, or Firm—Frank J. Jordan

[57] ABSTRACT

A sliding constant velocity universal joint comprises an annular outer joint member with a polygonal bore within which a ball retaining cage is guided.

6 Claims, 9 Drawing Figures

SLIDING CONSTANT VELOCITY UNIVERSAL JOINT

The present invention relates to a sliding constant velocity universal joint more particularly, to an outer member having an inner surface for coaction with an outer spherical surface or a spherical portion on an outer surface of a ball retaining cage.

A known form of sliding constant velocity universal joint comprises an annular outer joint member having grooves on its inner surface parallel with the axis of the joint. An inner joint member is positioned with the outer joint member and is provided with grooves on its outer surface to form pairs of opposed grooves with the grooves on the outer joint member. A ball is positioned in every pair of opposed grooves and a cage disposed between the two joint members retains the balls in a plane perpendicular to the axis of the cage. The cage is guided within the outer joint member by a spherical portion on the outer face of the cage and is guided with respect to the inner joint member by a spherical surface portion on the inner face of the cage. The centers of the outer and inner spherical portions of the cage are equidistant on opposite sides of the plane passing through the centers of the balls. The outer spherical portion of the cage is guided on a cylindrical surface formed on the inner face of the outer joint member.

In a sliding constant velocity universal joint as described above, the outer spherical portion of the cage is guided within cylindrical bore and contacts slidably with the cylindrical surface of the outer joint member. The ball is positioned in every pair of opposed grooves of the outer and inner joint members to transmit torque. This construction has the disadvantage that because there is an area of sharp concentration of stress adjacent a leading one of both side edges of every groove of the outer joint member when torque is transmitted from the inner joint member to the outer joint member, as the torque increases, the area on the cylindrical surface which is adjacent the leading edge of every groove is likely to be deformed inwardly to form a projection which may engage with the outer spherical portion of the cage to hinder the guiding of the ball cage within the cylindrical bore. To prevent the projection from engaging firmly with the outer spherical portion of the cage, it is known to chamfer both side edges of every groove. This method is not sufficient, however. As a result, the torque transmitted by the sliding constant velocity universal joint is limited and is low.

It is therefore the principal object of the present invention to provide a sliding constant velocity universal joint which can transmit substantially higher torques with the same structural volume of the joint.

It is another object of the present invention to provide a sliding constant velocity universal joint of the above character which can be constructed from a conventional sliding constant velocity universal joint with modification of minimum number of component part of the conventional joint.

The above and other objects, features and advantages of the present invention will become clear from the following description in connection with the accompanying drawings, in which.

Figure 1:
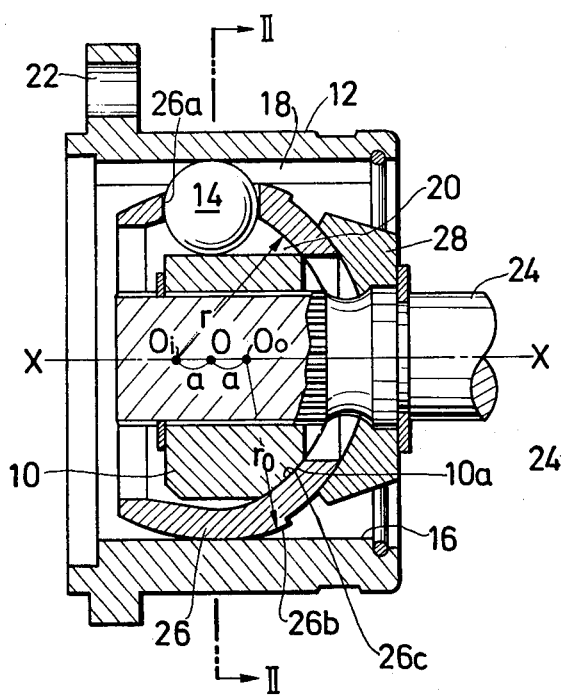
FIG. 1 is a longitudinal sectional view of a sliding joint according to the prior art and taken along the line I—I of FIG. 2.
Figure 2:
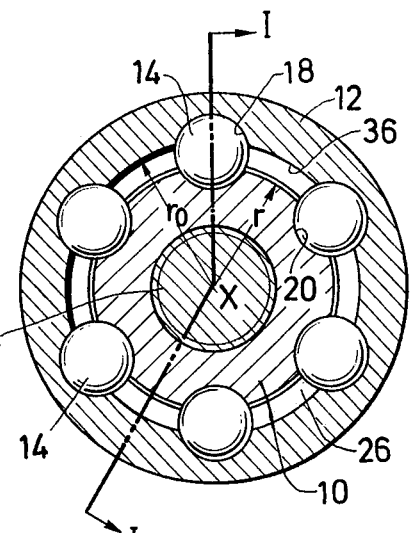
FIG. 2 is a sectional view taken along the line II—II of FIG. 1.

Referring to FIGS. 1 and 2 there is shown the sliding joint to which the present invention is applied.

The sliding joint comprises an inner joint member 10 axially movable within an annular outer joint member 12 and coupled therein to a series of equiangularly spaced torque-transmitting balls 14 (see FIG. 2) The sectioning of the joint is taken in different radial planes above and below the joint axis X—X, respectively, whereby to show above that axis the sectional form of the joint components between the adjacent balls 14. The outer member 12 has an interior surface forming a cylindrical bore 16 machined with longitudinally extending grooves 18. The exterior surface of the inner member 10 is similarly machined with grooves 20. The grooves 18 and 20 cooperate in pairs to provide ball tracks along which the balls 14 roll during joint articulation and plunge. At one end of the outer member 12 it has an external peripheral flange 22 and bolting to a driven shaft (not shown), while the inner member 10 has a splined connection with a drive shaft 24 which projects from the opposite end of the outer member 12. For keeping the balls 14 in a so-called constant velocity plane, that is, a plane which passes through the instantaneous center of the joint and bisects the instantaneous drive and driven axes of the joint, the balls are closely received in respective windows 26a of a ball cage 26 which is guided by a part-spherical portion 26b on its exterior surface in the cylindrical bore 16 of the outer member 12 and by a part-spherical portion 26c on its interior surface on a part-spherical portion 10a on the exterior surface of the inner member 10. The center points of curvature Oo and Oi of the part-spherical portions 26b and 26c of the cage 26 are offset by an equal amount on the opposite sides of the joint center O along the joint axis X—X to achieve the offset effect. A restraining member 28 is provided to assist the cage 26 in preventing relative axial movement between the cage 26 and the inner member 10.

Figure 3:
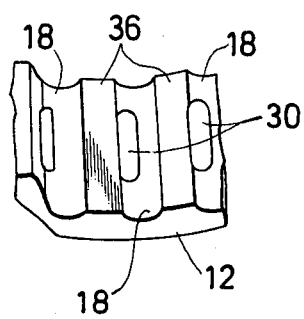
FIG. 3 is a fragmentary diagram of the outer joint member of the sliding joint of FIG. 1.
Figure 4:
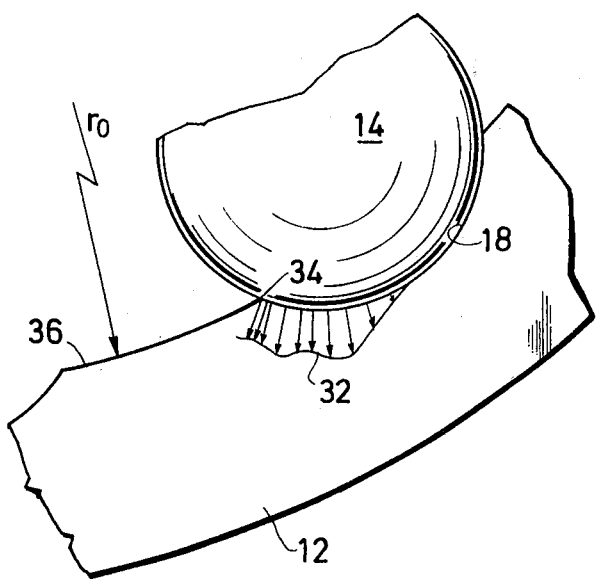
FIG. 4 is an enlarged diagram showing the stress distribution on the outer joint member.

Driving torque from the drive shaft 24 is transmitted by the grooves 20 of the inner member 10 to the balls 14 which in turn transmit the driving torque to the grooves 18 of the outer member 12. Since stress concentrates on a leading side edge, with respect to the rotation of the joint, of each of the grooves 18 of the outer member 12 during the torque transmission, an abutting mark 30 is formed in each of the grooves 18 (see FIG. 3), the abutting mark extending longitudinally along the groove. FIG. 4 illustrates an enlarged diagrammatic view of one of the balls 14 engaging in the groove 18 of the outer member 12 to show a stress distribution 32 determined with a photoelastic test.

Figure 5:
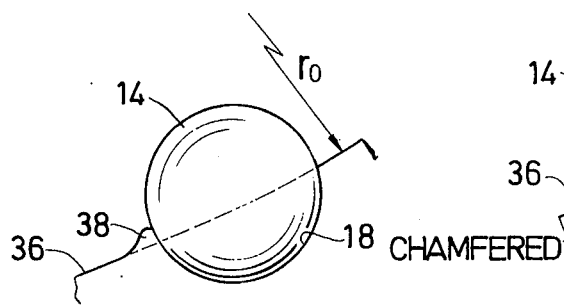
FIG. 5 is a diagram similar to FIG. 4 showing a projection resulted from the sharp stress concentration.
Figure 6:
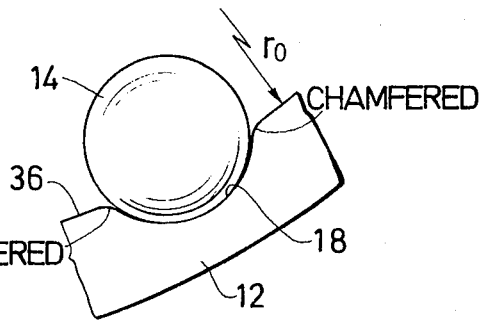
FIG. 6 is a similar view to FIG. 5 showing a groove with chamfered side edges.

When the balls 14 transmit an excessive driving torque to the grooves 18, stress will concentrate sharply on an edge designated as 34 in FIG. 4, deforming an adjacent one of cylindrical surface portions 36 on the interior surface of the outer member 12 to generate a projection 38 on the part-cylindrical portion 36 (see FIG. 5).

For the purpose of preventing the projection 38 from engaging firmly with the part-spherical portion 26b on the exterior surface of the cage 26, both side edges of each of the grooves 18 are chamfered after the grooves 18 are machined. This conventional practice is not sufficient, however to solve the problem described above.

Figure 7:
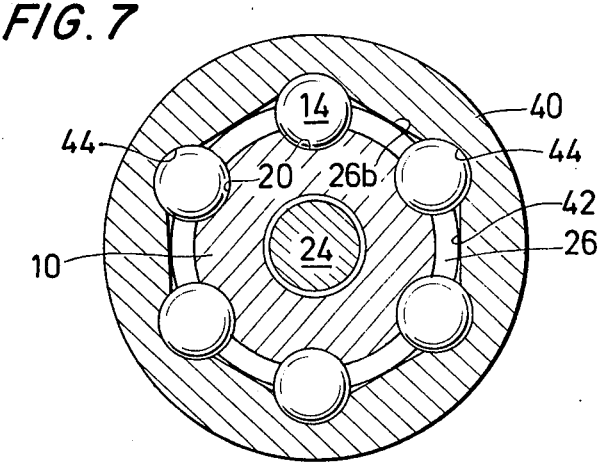
FIG. 7 is a similar view to FIG. 2 showing one embodiment of a sliding joint according to the present invention.
Figure 8:
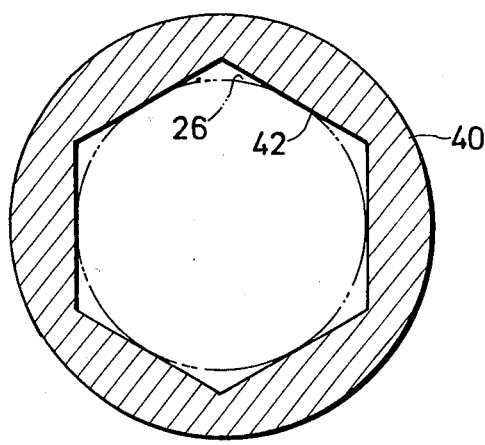
FIG. 8 is a sectional view of the outer joint member showing a polygonal bore.
Figure 9:
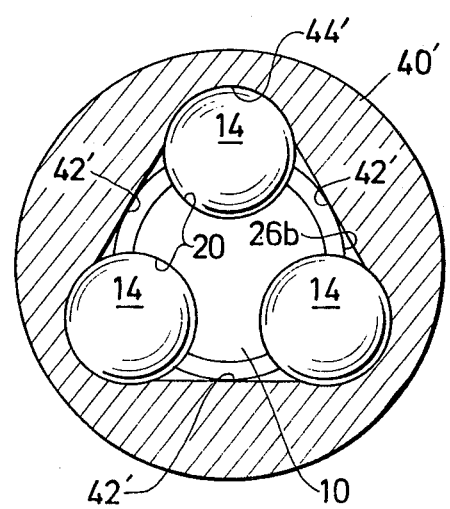
FIG. 9 is a similar view to FIG. 2 showing another embodiment of a sliding joint according to the present invention.

The present invention aims at eliminating the problem encountered in the conventional sliding joint and two embodiments according to the present invention are illustrated in FIGS. 7 through 9.

Referring to FIGS. 7 and 8, an outer joint member 40 is formed on its interior surface with a plurality of flat portions 42 corresponding in number to the plurality of torque transmitting balls 14. Each flat portion 42 intersects its adjacent flat portions so that the section of an axial bore of an outer member is a regular polygon (see FIG. 8). The outer member is machined at intersections between two of the flat portions 42 with a plurality of longitudinally extending grooves 44, corresponding in number to the plurality of torque transmitting balls 14.

When the outer member is assembled with the plurality of balls 14 and a ball cage 26 having a part-spherical portion 26b on its exterior surface, the balls 14 engage with respective grooves 20 and 44 and the flat portions 42 engages slidingly with the part-spherical portion 26b (see FIG. 7). Each of the flat portions 42 between the adjacent two of the grooves 44 and the part-spherical portion 26b make a line-to-line contact and form two spaces on the opposite sides of the contacting line, each of the two spaces gradually increasing its spacing as each of the flat portions approaches one of the adjacent two grooves 44. It is to be noted that when a plurality projections are formed on the flat portions in areas adjacent side edges of the grooves as a result of transmission of higher torques, the engagement of the plurality of projections with the part-spherical portion 26b on the exterior surface of the cage will be prevented by the spaces.

FIG. 9 shows a second embodiment in which the present invention is applied to a sliding joint having three torque transmitting balls 14. An outer joint member 40' has three flat portions 42' and three grooves 44' at intersections of two of the flat portions. Each flat portion 42' intersects its adjacent flat portions so that the section of an axial bore of the outer member is a regular triangle.

It will be noted that the flat portions and the grooves of the outer member extend longitudinally in parallel and this prevents a broach from rotating upon broaching the outer member because a broach guide of the broach is regular polygonal.

What is claimed is:

1. A sliding constant velocity universal joint comprising:
    an outer member having an interior surface defining an axial bore, said interior surface of said outer member having a plurality of axially extending grooves and a plurality of axially extending flat portions corresponding in number to the plurality of grooves, each of said plurality of axially extending flat portions extending between and merging into the adjacent two of said axially extending grooves, said plurality of axially extending flat portions forming the sides of a substantially regular polygonal bore;
    a ball cage within said axial bore, said cage having a curved exterior surface which engages a portion of each of said flat portions intermediate the adjacent two axially extending grooves to provide two spaces between said curved exterior surface and said flat portion on opposite sides of said flat portion;
    an inner member within said ball retaining cage having a plurality of grooves corresponding in number to the grooves of said outer member; and
    a plurality of balls corresponding in number to the number of grooves of said outer member, each of said balls being mounted between a respective one of said grooves of said outer member and a respective one of said grooves of said inner member and retained by said cage.

2. A sliding constant velocity universal joint as claimed in claim 1, in which said curved exterior surface of said cage is at least partly spherical.

3. A sliding constant velocity universal joint as claimed in claim 1, in which the number of axially extending flat portions is six.

4. A sliding constant velocity universal joint as claimed in claim 1, in which the number of axially extending flat portions is three.

5. A sliding constant velocity universal joint as claimed in claim 1, in which the number of axially extending flat portions is four.

6. A sliding constant velocity universal joint comprising:
    an outer member having an interior surface defining an axial bore, said interior surface of said outer member having a plurality of axially extending grooves and a plurality of axially extending flat portions corresponding in number to the plurality of grooves, each of said plurality of axially extending flat portions extending between and merging into the adjacent two of said axially extending grooves, said plurality of axially extending flat portions forming the sides of a substantially regular polygonal bore.
    a ball cage within said axial bore, said cage having a first curved outer surface portion which engages a portion of each of said flat portions intermediate the adjacent two grooves of said outer member to provide two spaces between said curved exterior surface and said flat portion on opposite sides of said flat portion, said cage having a second curved outer surface portion adjacent one end thereof and a curved inner surface portion adjacent said one end, the center of curvature of said first outer surface portion and the center of curvature of at least one of said second outer surface portion of said cage and inner surface portion of said cage being offset by an equal amount on opposite sides of the joint center along the joint axis;
    an inner member within said ball cage having a curved outer surface portion which engages said inner surface portion of said cage, said inner member having a plurality of grooves corresponding in number to the grooves in said outer member;

a plurality of balls mounted in grooves between said outer and inner members and retained by said cage; and a restraining member movable with said inner member and having a curved inner surface which engages said second outer surface portion of said cage to assist in preventing relative axial movement between said cage and inner member in at least one direction.

* * * * *